United States Patent [19]

Wiltshire et al.

[11] Patent Number: 5,479,281
[45] Date of Patent: Dec. 26, 1995

[54] DISPLAY DEVICES

[75] Inventors: Michael C. K. Wiltshire, High Wycombe; Colin T. H. Yeoh, London; Mark F. W. Charsley, Hitchin, all of Great Britain

[73] Assignee: GEC-Marconi Limited, Stanmore, United Kingdom

[21] Appl. No.: 182,056

[22] PCT Filed: May 14, 1993

[86] PCT No.: PCT/GB93/00989

§ 371 Date: Jan. 18, 1994

§ 102(e) Date: Jan. 18, 1994

[87] PCT Pub. No.: WO93/23788

PCT Pub. Date: Nov. 25, 1993

[30] Foreign Application Priority Data

May 15, 1992 [GB] United Kingdom ............. 9210420

[51] Int. Cl.⁶ .................................. G02F 1/1335
[52] U.S. Cl. .................. 359/63; 359/78; 359/100
[58] Field of Search ................... 359/63, 78, 100

[56] References Cited

U.S. PATENT DOCUMENTS

| | | | |
|---|---|---|---|
| 4,709,994 | 12/1987 | Kanbe | 359/100 |
| 4,878,740 | 11/1989 | Inaba et al. | 350/337 |
| 5,082,352 | 1/1992 | Kawagishi | 359/63 |

FOREIGN PATENT DOCUMENTS

| | | | |
|---|---|---|---|
| 166326 | 10/1983 | Japan | 359/63 |
| 40623 | 3/1984 | Japan | 359/78 |
| 125321 | 6/1987 | Japan | 359/63 |

OTHER PUBLICATIONS

Optical Engineering, vol. 26, No. 5, May, 1987, pp. 373–384, "Properties and Applications of Ferroelectric Liquid Crystals", J. S. Patel et al.

Molecular Crystals and Liquid Crystals, vol. 143, Feb., 1987, pp. 101–112, "Electrooptics of a Thin Ferroelectric Smectic C* Liquid Crystal Layer", M. I. Barnik et al.

*Primary Examiner*—William L. Sikes
*Assistant Examiner*—Tiep H. Nguyen
*Attorney, Agent, or Firm*—Spencer, Frank & Schneider

[57] ABSTRACT

A reflective liquid crystal display device includes a ferroelectric liquid crystal cell, a first polarizer through which light from a light source passes before passing through the cell, a second polarizer through which the light passes after passing through the cell, and a reflective layer which reflects the light back through the second polarizer, the cell and the first polarizer, in that order, for viewing by an observer. In order to obtain a bright image, the first and second polarizers are orientated with their directions of polarization at angles of $\alpha$ and $\beta$, respectively, relative to the alignment direction, the value of $\alpha+\beta$ being determined from $$\alpha + \beta = 0.5 \cos^{-1}\left[\frac{-\sec(4\theta_c) \pm \sqrt{\sec^2(4\theta_c) + 8}}{4}\right]$$

where the optic axes in the two switching states of the liquid crystal material are at angles of $+\theta_c$, and $-\theta_c$, respectively, to the alignment direction wherein angle $\theta_c$ is in a range wherein $\theta_c < 22.5°$.

2 Claims, 1 Drawing Sheet

DISPLAY DEVICES

BACKGROUND OF THE INVENTION

This invention relates to display devices, and particularly to ferroelectric liquid crystal display devices.

The majority of liquid crystal displays (LCDs) rely on the use of two polarisers to render visible the difference between the switched and unswitched regions. These polarisers are disposed one each side of the LC cell. The appearance of the display depends critically on both the performance and the alignment of these polarisers.

For example, in a twisted nematic LCD, one polariser is aligned so that its absorption axis is either parallel or perpendicular to the alignment direction of the liquid crystal molecules (the director) on the neighbouring wall of the cell. The other polariser is arranged either parallel (for a dark OFF state) or perpendicular (for a bright OFF state) to the first polariser, and is placed on the second wall of the cell. Such arrangements are well known in the art.

In ferroelectric LCDs, which operate by switching the LC director in the plane of the LC layer, the polarisers are generally set to be crossed, with one polariser axis parallel to the LC director in one of the display states. Such polariser alignments provide displays with high contrast which are suitable for viewing in transmission and are well known to those skilled in the art.

Reflective LCDs are constructed in the same way, but with an additional reflective layer (generally non-specular) disposed behind the rear polariser. Therefore light passes through the polariser/LC cell/polariser combination twice in opposite directions. It is found that displays constructed using conventional methods described above are very dull and difficult to read. They maintain high contrast, but, because of the double passage of the light through the display, the nominally "bright" states are, in fact, also rather dark, making them difficult to use.

SUMMARY OF THE INVENTION

It is an object of the present invention to provide an improved reflective ferroelectric liquid crystal display.

According to the invention there is provided a reflective liquid crystal display device, comprising a ferroelectric liquid crystal cell; a first polariser through which light from a light source passes before passing through the cell; a second polariser through which the light passes after passing through the cell; and means to reflect the light back through the second polariser, the cell and the first polariser in that order for viewing by an observer; wherein the first and second polarisers are orientated with their directions of polarisation at angles of $\alpha$ and $\beta$, respectively, relative to an alignment direction, the value of $\alpha+\beta$ being determined from the formula $$\alpha + \beta = 0.5 \cos^{-1}\left[\frac{-\sec(4\theta_c) \pm \sqrt{\sec^2(4\theta_c) + 8}}{4}\right]$$

where the optic axes in the two switching states of the liquid crystal material are at angles of $+\theta_c$ and $-\theta_c$, respectively, to the alignment direction.

BRIEF DESCRIPTION OF THE DRAWINGS

An embodiment of the invention will now be described, by way of example, with reference to the accompanying drawing, in which.

DETAILED DESCRIPTION OF THE INVENTION

Figure 1:
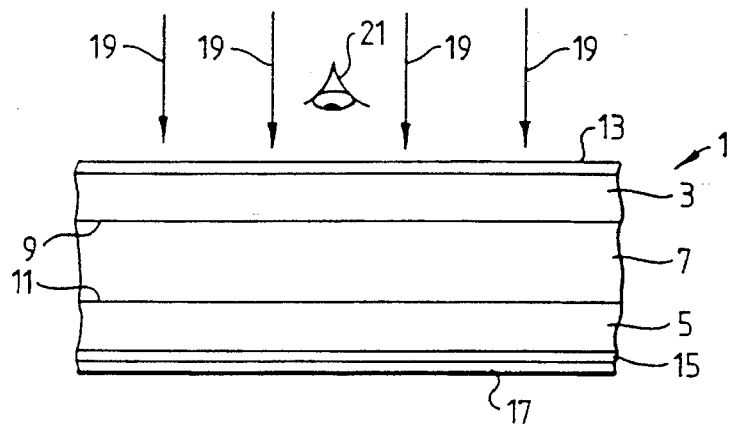
FIG. 1 is a schematic sectional view of a reflective ferroelectric liquid crystal display device.

Referring to FIG. 1, a reflective liquid crystal display device 1 comprises substrates 3 and 5 which contain there between a layer 7 of a ferroelectric liquid crystal material. The inner surfaces 9,11, respectively, of the substrates 3 and 5 are rubbed in a predetermined alignment direction, the direction being the same for both substrates. A first polariser 13 is located at the upper surface of the substrate 3 and a second polariser (analyser) 15 is located at the lower surface of the substrate 5, as viewed in FIG. 1. A reflective layer 17 is disposed beneath the polariser 15. In use of the device 1, light, as indicated by arrows 19, passes through the polariser 13, the substrate 3, the liquid crystal layer 7, the substrate 5 and the polariser 15, and is reflected by the layer 17 so that it returns through those elements to reach an observer 21. The liquid crystal material is switched between bright and dark states by application of an electric field thereto, using suitable electrodes (not shown) provided on the substrates.

Known displays of this kind are generally adjusted for high contrast ratio. The contrast ratio, R, is the ratio of the transmission of the bright state, $T_1$, to that of the dark state, $T_2$. These transmissions may be taken at a single wavelength, e.g. 550 nm, to match the peak of the human eye response curve, or are preferably taken as an integral over the range of wavelengths to which the eye is sensitive. It is common to derive the luminance transmission Y of an LCD as $$Y = k \int_{380}^{770} T(\lambda) S(\lambda) \bar{y}(\lambda) d\lambda$$

where

T($\lambda$) is the transmission spectrum,

S($\lambda$) is the spectral intensity distribution of the light source used for viewing the display, y($\lambda$) is the 1931 CIE colour matching function which equates with the eye response function, and k is a normalising factor given by $$k = 100 / \int_{380}^{770} S(\lambda) \bar{y}(\lambda) d\lambda$$

The ratio of the luminance transmission of the bright state, $Y_1$, to that in the dark state, $Y_2$, is the luminance contrast ratio. It is this which is usually optimised.

In a simple conceptual ferroelectric liquid crystal display the device acts as a ½-wavelength plate at 550 nm, the optic axis of the device being switched through 45°, i.e. twice the smectic C cone angle $\theta_c$ of 22.5°. The device is placed between crossed polarisers with the optic axis in one state aligned with a polariser. This provides the ideal device, and this condition can be approached by hard-driven shutter cells. Multiplexed FLCDs, on the other hand, do not switch through 45°. Indeed, in many cases, switching angles as low as 15° are encountered, i.e. an effective cone angle $\theta_c$ of approximately 8°. If such a cell is placed between crossed polarisers as above, then the bright state reflectivity will be only about 1.2% using polarisers obtainable in practice (i.e. not theoretically ideal polarisers). Such a device produces a very dark and barely acceptable display.

Figure 2:
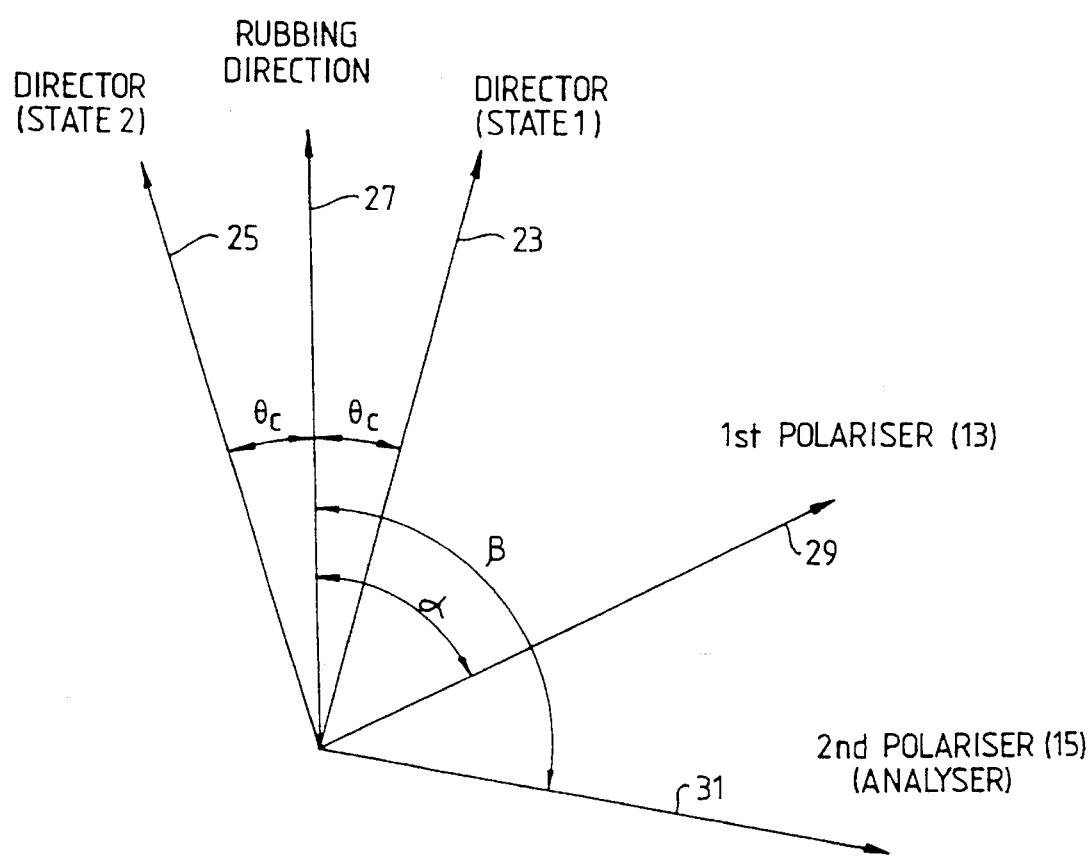
FIG. 2 illustrates, schematically, angles relevant to the present invention.

However, in accordance with the present invention a different configuration is used. Referring to FIG. 2 of the drawings, the directors of the ferroelectric liquid crystal material in its two switching states are orientated at angles $+\theta_c$ and $-\theta_c$ to the rubbing (alignment) direction 27, as indicated by lines 23 and 25, respectively. The first polariser 13 is orientated so that its optic axis is at an angle $\alpha$ to the rubbing direction, as indicated by a line 29, and the second polariser 15 is orientated so that its optic axis is at an angle $\beta$ to the rubbing direction, as indicated by a line 31.

The values of the angles are determined in accordance with the following formula $$\alpha + \beta = 0.5 \cos^{-1}\left[\frac{-\sec(4\theta_c) \pm \sqrt{\sec^2(4\theta_c) + 8}}{4}\right].$$

For example, assuming an effective cone angle $\theta_c$ of 8° as mentioned above, $\alpha+\beta$ is 31°, and the bright-state reflectivity is 17.8%, which gives a bright legible image.

For a different embodiment of the device, the effective cone angle $\theta_c$ might be 15°. Using the orientations determined in accordance with the invention, a bright-state reflectivity of 20.25% is obtainable, which is within 0.25% of the maximum achievable. This gives a very bright display. Using the conventional orientations, a bright-state reflectivity of only 11.5% would be obtainable.

Instead of the ferroelectric liquid crystal material mentioned above, a ferroelectric liquid crystal polymer might be used. In that case, the alignment direction would still be the direction in which a nematic liquid crystal material would align given the same alignment surfaces.

We claim:

1. A reflective liquid crystal display device, comprising:

a ferroelectric liquid crystal cell having two switching states with respective optic axes;

a first polariser through which light from a light source passes before passing through the cell;

a second polariser through which the light passes after passing through the cell; and means for reflecting the light back through the second polariser, the cell and the first polariser in that order for viewing by an observer;

wherein the first and second polarisers are orientated with their directions of polarisation at angles of $\alpha$ and $\beta$, respectively, relative to an alignment direction, the value of $\alpha+\beta$ being determined from the formula $$\alpha + \beta = 0.5 \cos^{-1}\left[\frac{-\sec(4\theta_c) \pm \sqrt{\sec^2(4\theta_c) + 8}}{4}\right]$$

where the optic axes in the two switching states of the liquid crystal cell are at angles of $+\theta_c$ and $-\theta_c$, respectively, to the alignment direction, and wherein angle $\theta_c$ is in a range where $\theta_c < 22.5°$.

2. A device as claimed in claim 1, wherein the alignment direction is determined by the direction of rubbing of alignment surfaces in contact with the ferroelectric liquid crystal cell.

* * * * *